US009860738B2

(12) United States Patent
Park et al.

(10) Patent No.: US 9,860,738 B2
(45) Date of Patent: Jan. 2, 2018

(54) METHOD FOR PROCESSING MULTIPLE PIECES OF SIM INFORMATION AND ELECTRONIC DEVICE THEREOF

(71) Applicant: Samsung Electronics Co., Ltd., Suwon-si, Gyeonggi-do (KR)

(72) Inventors: Dae-Soo Park, Gumi-si (KR); Jong-Phil Lee, Daegu (KR); Jin-Woo Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/585,769

(22) Filed: Dec. 30, 2014

(65) Prior Publication Data

US 2015/0189496 A1    Jul. 2, 2015

(30) Foreign Application Priority Data

Jan. 2, 2014    (KR) .................. 10-2014-0000303

(51) Int. Cl.
*H04W 8/18*    (2009.01)
*H04M 1/00*    (2006.01)
*H04M 1/725*  (2006.01)

(52) U.S. Cl.
CPC ........ *H04W 8/183* (2013.01); *H04M 1/72519* (2013.01); *H04M 2250/66* (2013.01)

(58) Field of Classification Search
CPC ..... H04W 48/18; H04W 88/06; H04W 12/04; H04W 8/12; H04W 12/00; H04W 48/20; H04M 1/72577; H04M 3/00; H04M 3/42263; H04M 3/42272; H04M 1/675; H04M 15/77; H04M 15/774; H04M 1/0254; H04L 67/20
See application file for complete search history.

(56) References Cited

U.S. PATENT DOCUMENTS

| | | | |
|---|---|---|---|
| 5,907,616 A * | 5/1999 | Brogger ............ | G06Q 20/3672 235/380 |
| 5,933,785 A * | 8/1999 | Tayloe .................. | H04W 8/26 455/435.2 |
| 8,406,741 B2 | 3/2013 | Kang et al. | |
| 2008/0242270 A1 * | 10/2008 | Marui ............... | H04M 1/72519 455/413 |
| 2009/0227242 A1 * | 9/2009 | Lee ................... | H04M 1/27455 455/418 |
| 2010/0148970 A1 * | 6/2010 | Angell ................. | G06F 19/363 340/573.1 |
| 2011/0117964 A1 * | 5/2011 | Luo ...................... | H04W 48/18 455/558 |
| 2012/0282903 A1 * | 11/2012 | Rabra ............... | H04M 3/42272 455/414.1 |

(Continued)

*Primary Examiner* — Nizar Sivji
(74) *Attorney, Agent, or Firm* — Jefferson IP Law, LLP

(57) ABSTRACT

A method configured to set a communication environment of an electronic device is provided. The method includes detecting a user's input and selecting at least two pieces of information from among multiple pieces of user identification information comprised in a single SIM module, and determining communication environments corresponding to the at least two pieces of user identification information. The communication environments are loaded into the electronic device all together.

17 Claims, 10 Drawing Sheets

(56) References Cited

U.S. PATENT DOCUMENTS

| | | | | |
|---|---|---|---|---|
| 2014/0094148 A1* | 4/2014 | Lang | ................ | H04L 67/20 |
| | | | | 455/411 |
| 2014/0141774 A1* | 5/2014 | Jin | ................ | H04W 8/12 |
| | | | | 455/433 |
| 2014/0189850 A1* | 7/2014 | Marshall | ................ | G06F 21/30 |
| | | | | 726/17 |
| 2014/0228071 A1* | 8/2014 | Villarrubia Grande | ................ | H04M 1/72519 |
| | | | | 455/552.1 |
| 2014/0298018 A1* | 10/2014 | Haggerty | ................ | H04W 4/003 |
| | | | | 713/168 |
| 2015/0280983 A1* | 10/2015 | Staykoff | ................ | H04L 51/00 |
| | | | | 709/226 |
| 2015/0312281 A1* | 10/2015 | Martinez | ................ | H04L 65/1016 |
| | | | | 709/228 |
| 2016/0050711 A1* | 2/2016 | Wang | ................ | H04W 12/00 |
| | | | | 370/254 |

* cited by examiner

METHOD FOR PROCESSING MULTIPLE PIECES OF SIM INFORMATION AND ELECTRONIC DEVICE THEREOF

CROSS-REFERENCE TO RELATED APPLICATION(S)

This application claims the benefit under 35 U.S.C. §119 (a) of a Korean patent application filed on Jan. 2, 2014 in the Korean Intellectual Property Office and assigned Serial number 10-2014-0000303, the entire disclosure of which is hereby incorporated by reference.

TECHNICAL FIELD

The present disclosure relates to a method for communicating based on multiple pieces of Subscriber Identity Module (SIM) information, and an electronic device thereof. More particularly, the present disclosure relates to a method for establishing two or more communication environments in a single electronic device without changing a SIM card including SIM information.

BACKGROUND

An electronic device may need to establish a designated communication environment based on registered user identification information in order to communicate with other electronic devices in a designated communication method. The electronic device needs a single piece of user identification information to establish a single communication environment. The electronic device may establish multiple communication environments based on multiple pieces of user identification information. To establish the multiple communication environments, the electronic device should be able to change a Subscriber Identity Module (SIM) card including SIM information or mount two or more SIM cards.

Therefore, a need exists for a method for establishing two or more communication environments in a single electronic device without changing a SIM card including SIM information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for establishing at least two communication environments in a single electronic device without changing a Subscriber Identity Module (SIM) card including SIM information.

Another aspect of the present disclosure is to provide a method for establishing at least two communication environments in a single electronic device without mounting at least two SIM cards.

In accordance with an aspect of the present disclosure, a method for setting a communication environment of an electronic device is provided. The method includes detecting a gesture (e.g., a user's input) and selecting at least two pieces of information from among multiple pieces of user identification information included in a single SIM module, and determining communication environments corresponding to the at least two pieces of user identification information, wherein the communication environments are loaded into the electronic device all together.

In accordance with another aspect of the present disclosure, an electronic device is provided. The electronic device includes a first memory configured to store user identification information corresponding to a set communication environment, a single SIM module configured to detect a gesture and select at least two pieces of information from among multiple pieces of user identification information, to determine communication environments corresponding to the at least two pieces of user identification information, and to process to load the communication environments into the electronic device all together and communicate independently, and at least one first processor configured to control the SIM module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
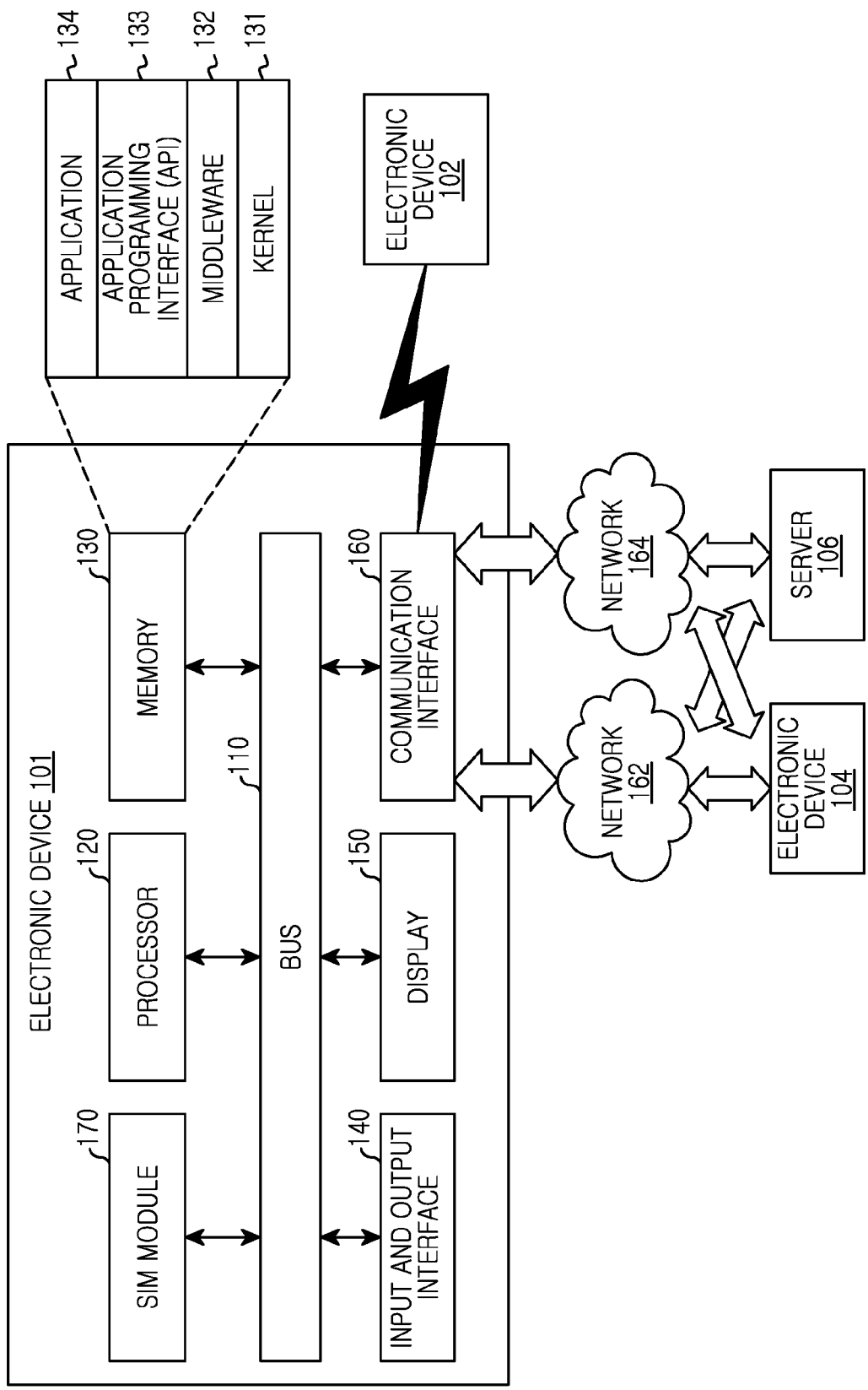
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "or" used in various embodiments of the present disclosure includes any and all combinations of words enumerated with it. For example, "A or B" means including A, including B, or including both A and B.

Although the terms, such as "first" and "second", used in various embodiments of the present disclosure may modify various elements of the present disclosure, these terms do not limit an order and/or importance of the corresponding elements. These terms may be used for the purpose of distinguishing one element from another element.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

The terms used in various embodiments of the present disclosure are for the purpose of describing particular embodiments only and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise, and should not be interpreted as having ideal or exaggerated meanings unless they are clearly defined in various embodiments of the present disclosure.

An electronic device according to various embodiments of the present disclosure may be equipped with a communication function. For example, the electronic device may include at least one of various devices which include a communication function, such as a smartphone, a tablet Personal Computer (PC), a mobile phone, a video phone, an electronic book reader, a desktop PC, a laptop PC, a netbook computer, a Personal Digital Assistant (PDA), a Portable Multimedia Player (PMP), a Motion Pictures Expert Group (MPEG-1 or MPEG-2) Audio Layer 3 (MP3) player, a mobile medical device, and a camera, or devices which can set a security environment, such as a wearable device (e.g., a Head Mounted Device (HMD), such as electronic glasses, electronic clothing, an electronic bracelet, an electronic necklace, an electronic appcessory, a smart watch, and the like). In addition, the electronic device according to various embodiments of the present disclosure may be one or a combination of one or more of the above-described devices. In addition, it is obvious to an ordinary skilled person in the related art that the electronic device according to various embodiments of the present disclosure is not limited to the above-mentioned devices.

Hereinafter, an electronic device according to various embodiments of the present disclosure will be explained with reference to the accompanying drawings. The term "user" used in various embodiments of the present disclosure may refer to a person who uses the electronic device or a device that uses the electronic device (e.g., an artificial intelligence electronic device).

FIG. 1 illustrates a network environment including an electronic device according to various embodiments of the present disclosure.

Referring to FIG. 1, an electronic device 101 may include a bus 110, a processor 120, a memory 130, an input and output interface 140, a display 150, a communication interface 160, and a SIM module 170.

The bus 110 may be a circuit which connects the above-described elements with one another and transmits a communication signal (e.g., a control message) between the above-described elements.

The processor 120 may receive instructions from the other elements (e.g., the memory 130, the input and output interface 140, the display 150, the communication interface 160, or the SIM module 170) via the bus 110, decipher the instructions, and perform calculation or data processing according to the deciphered instructions. According to an embodiment of the present disclosure, the processor 120 may connect with a second electronic device 102 via one or more network communication environments through the communication interface 160 based on information received from the SIM module 170.

The memory 130 may store instructions or data which is received from or generated by the processor 120 or the other elements (e.g., the input and output interface 140, the display 150, the communication interface 160, or the SIM module 170). In addition, the memory 130 may include programming modules, such as a kernel 131, middleware 132, an Application Programming Interface (API) 133, an application 134, and the like. Each of the above-described programming modules may be configured by software, firmware, hardware, or a combination of two or more of them.

The kernel 131 may control or manage system resources (e.g., the bus 110, the processor 120, the memory 130, and the like) which are used for performing operations or functions implemented in the other programming modules, for example, the middleware 132, the API 133, or the application 134. In addition, the kernel 131 may provide an interface for allowing the middleware 132, the API 133, or the application 134 to access an individual element of the electronic device 101 and control or manage the element.

The middleware 132 may serve as an intermediary to allow the API 133 or the application 134 to communicate with the kernel 131 and exchange data with the kernel 131. In addition, the middleware 132 may perform controlling (e.g., scheduling or load balancing) with respect to work requests received from the application 134, for example, by giving priority to use the system resources of the electronic device 101 (e.g., the bus 110, the processor 120, the memory 130, and the like) to at least one of the applications 134.

The API 133 is an interface for allowing the application 134 to control a function provided by the kernel 131 or the middleware 134, and, for example, may include at least one interface or function (e.g., instructions) for controlling a file, controlling a window, processing an image, or controlling a text.

The application 134 may be an application related to information exchange between the electronic device 101 and an external electronic device (e.g., the electronic device 102 or an electronic device 104). For example, the application related to the information exchange may include a notification relay application for relaying specific information to the external electronic device or a device management application for managing the external electronic device. According to various embodiments of the present disclosure, the application 134 may include an application additionally specified according to an attribute (e.g., a kind of electronic device) of the external electronic device (e.g., the electronic device 102 or 104).

The input and output interface 140 may transmit instructions or data input by the user through a sensor (e.g., an acceleration sensor, a gyro sensor) or an input device (e.g., a keyboard or a touch screen) to the processor 120, the memory 130, the communication interface 160, or the SIM module 170 through the bus 110, for example. For example, the input and output interface 140 may provide data on a user's touch input through a touch screen to the processor 120. In addition, the input and output interface 140 may output instructions or data received from the processor 120, the memory 130, the communication interface 160, or the SIM module 170 through the bus 110 through an output device (e.g., a speaker or a display). For example, the input and output interface 140 may output audio data processed by the processor 120 to the user through a speaker.

The display 150 may display a variety of information (e.g., multimedia data or text data) for the user. The display 150 may be configured as a touch screen through which the user inputs instructions by touching or hovering the display 150 with an inputting unit. The touch screen may include a touch panel to be able to perform an input function and a display function simultaneously. The touch panel may include a Liquid Crystal Display (LCD) or an Active-Matrix Organic Light Emitting Diode (AM-OLED), and may be implemented to be flexible, transparent, or wearable. The touch panel may recognize a touch input in at least one method of capacitive, resistive, infrared, and ultrasonic methods. The touch panel may further include a controller. In the embodiment of a capacitive method, the touch panel may recognize not only a direct touch but also a proximity touch. The proximity touch may be referred to as a noncontact touch or hovering. The touch panel may further include a tactile layer to provide a tactile response to the user. The touch screen may include a hologram. The hologram may show a stereoscopic image in the air using interference of light. Additionally, the touch screen may further include a control circuit to control the touch panel or the hologram. Hereinafter, the touch screen and the touch panel may indicate the display 150 unless they are particularly distinguished.

The communication interface 160 may connect communications between the electronic device 101 and an external device (e.g., the electronic device 102, the electronic device 104, or a server 106). Moreover, the communication interface 160 may connect communications between the electronic device 101 and the electronic device 104 and the server 106 through networks 162 and 164, respectively. For example, the communication interface 160 may support a network communication (e.g., the Internet, a Local Area Network (LAN), a Wire Area Network (WAN), a telecommunication network, a cellular network, a satellite network, a Plain Old Telephone Service (POTS), and the like), a short-range communication (e.g., Wireless Fidelity (WiFi), Bluetooth (BT), Near Field Communication (NFC), Infrared Data Association (IrDA), ANT+, and the like), or a wire communication (e.g., a Universal Serial Bus (USB), a High Definition Multimedia Interface (HDMI), recommended standard (RS)-232, POTS, and the like). According to an embodiment of the present disclosure, a protocol for communicating between the electronic device 101 and the external device (e.g., a short-range communication protocol, a network communication protocol, or a wire communication protocol) may be supported by at least one of the API 133 or the middleware 132. The electronic devices 102 and 104 may be the same as the electronic device 101 (the same type of electronic device) or may be different from the electronic device 101 (a different type of electronic device). The electronic device 101 may connect two or more communications through the communication interface 160 based on SIM information included in the SIM module 170.

When the electronic device 101 detects a gesture, the SIM module 170 selects two or more of multiple pieces of user identification information, and determines communication environments corresponding to the two or more pieces of user identification information. The communication environments are loaded into the electronic device all together and are processed to independently communicate. The gesture recited herein may be a designated user input which is detected by the electronic device 101.

The SIM module 170 may include a memory which includes multiple pieces of user identification information and metadata, and a processor which determines a communication environment corresponding to user information. The SIM module 170 may exchange user identification information with the processor. The SIM module 170 may transmit information on one or more groups including user identification information to the processor. The SIM module 170 may include the information on the group which designates two or more of the multiple pieces of user identification information and includes the designated information in the metadata of the SIM module. The SIM module 170 may select two or more pieces of user identification information included in one group which is selected from the groups. When security is set for the user identification information and a designated security key is input, the SIM module 170 may complete the selecting. The SIM module 170 may process each of the communication environments to perform communication functions corresponding to two or more pieces of user identification information independently in the electronic device. The SIM module 170 may automatically select the group based on the metadata of the SIM module. The SIM module 170 may request the processor to display user identification information which is communicating in the communication environments on the electronic device. The SIM module 170 may include in the memory the metadata which stores one or more of information on whether user identification information is activated or deactivated, information on a SIM group when user identification information is included in a designated SIM group, information on one or more SIM groups, user identification information included in the SIM group, and information of a location where user identification information is stored.

Figure 2:
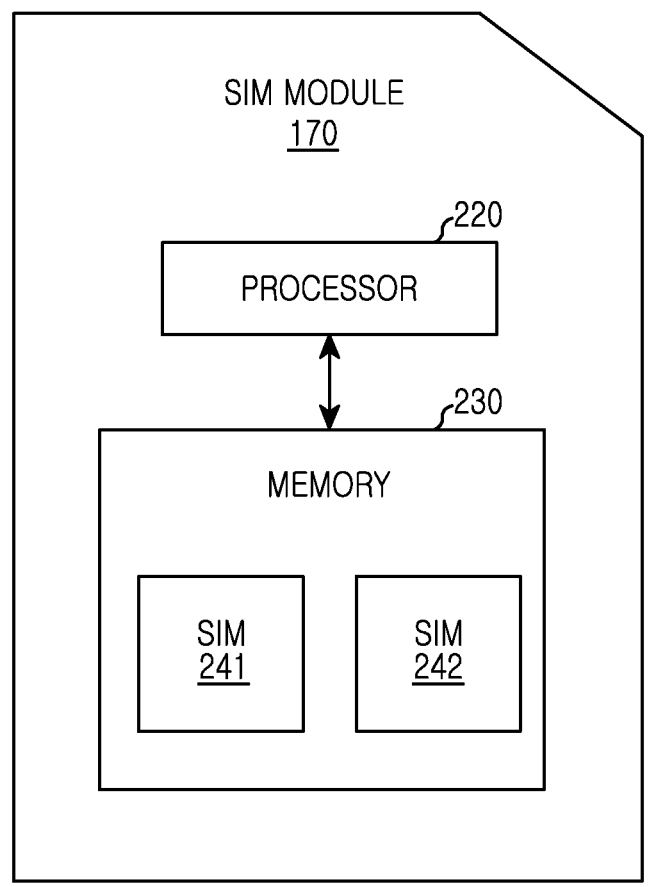
FIG. 2 illustrates a block diagram of a Subscriber Identity Module (SIM) module included in an electronic device according to various embodiments of the present disclosure.

FIG. 2 illustrates a block diagram of a SIM module included in an electronic device according to various embodiments of the present disclosure.

Referring to FIG. 2, a SIM module 170 may include one or more second processors 220 and a memory 230. The memory 230 may store two or more pieces of SIM information, such as first SIM information 241 and second SIM information 242.

According to an embodiment of the present disclosure, the multiple pieces of SIM information included in the SIM module 170 may be configured as a logic SIM, and is distinguished from a physical SIM in that the SIM may be included in the form of an embedded chipset, which is embedded during a manufacturing process or a distributing process.

The SIM module 170 included in the electronic device 101 may include one or more second processors 220 and may process SIM information (or user identification information) included in the SIM module 170 through the second processor 220. The second processor 220 may be configured as a Micro Controller Unit (MCU) in the form of an on-chip. The second processor 220 may transmit one or more pieces of SIM information (e.g., the first SIM information 241 or second SIM information 242) included in the memory 230 of the SIM module 170 to the first processor 120 of the electronic device 101. The second processor 220 may establish a communication environment of the electronic device 101 corresponding to each piece of SIM information based on the SIM information included in the memory 230 at a designated time (e.g., a power on time of the electronic device 101) (may load SIM information into the electronic device 101 or may set the communication environment in a system of the electronic device 101). The operation of establishing the communication environment may be an operation of connecting a communication with a telecommunications business operator which is registered to relay a communication with other electronic devices according to designated SIM information (user identification information).

The second processor 220 may authenticate SIM information to establish a communication environment in the electronic device 101. The authenticating process of the SIM information may be controlled through the second processor 220 of the SIM module 170, and, when the electronic device 101 needs to communicate with an external device, the second processor 220 may control the communication interface 160 through the first processor 120 of the electronic device 101 and request the communication interface 160 to communicate with the external device.

The memory 230 may store SIM information which is user identification information for establishing a communication environment of the electronic device 101. The memory 230 may store two or more pieces of SIM information and may store information on whether each piece of SIM information is activated or deactivated. According to an embodiment of the present disclosure, the memory 230 may store, in a separate storage area, such as metadata, information on whether each piece of SIM information is activated or deactivated, information on a SIM group when SIM information is included in a designated SIM group, information on one or more SIM groups, SIM information included in the SIM group, location of SIM information stored in the memory 230, or information on priority set for SIM information or a SIM group. When two or more pieces of SIM information are stored in the memory 230, information on a SIM group which is configured by the two or more pieces of SIM information may be stored in the metadata, and the processor 230 may select the SIM group and may establish a communication environment of each piece of SIM information in the electronic device 101 based on the two or more pieces of SIM information designated in the SIM group. According to an embodiment of the present disclosure, the SIM group may be determined based on a country (a country in which a business operator is registered, or a country code) of a telecommunications company (or a business operator) which provides a communication network according to SIM information. For example, when SIM information on 'SKT (Korea)', 'LGT (Korea)', 'T-Mobile (United States (U.S.))', 'Verizon (U.S.), 'ROGERS (Canada)' is included based on a country of a telecommunications company providing a communication environment of SIM information included in the SIM module 170, SIM information of 'SKT (Korea)' and SIM information of 'LGT (Korea)' may be designated as a single SIM group (e.g., are designated as a SIM group of 'Korea') and included. In this way, SIM information of 'T-Mobile (U.S.)' and SIM information 'Verizon (U.S.)' may be included in a SIM group corresponding to 'U.S.', and SIM information of 'ROGERS (Canada)' may be included in a SIM group corresponding to 'Canada'. Although the SIM groups are distinguished from one another based on country in the above-described example, this should not be considered as limiting. The SIM groups may be distinguished based on user's selection or priority which is determined according to an amount of used SIM information. A security key may be set for the SIM information or SIM group included in the memory, and the set security key may be stored in a designated location of the memory 230, such as metadata.

The SIM information may include setting information for establishing a designated network communication environment corresponding to a user designated through the communication interface 160 of the electronic device 101. According to an embodiment of the present disclosure, a single piece of SIM information may include information for establishing a communication environment of a single scheme for a designated user. The memory 230 of the SIM module 170 may include two or more pieces of SIM information (e.g., first SIM information 241 or second SIM information 242). The SIM module 170 requests the processor 220 to authenticate two or more pieces of SIM information included in the memory 230 so that two or more communication environments can be established in the electronic device 101.

Hereinafter, an operation of establishing a communication environment by interworking between the electronic device 101 and the SIM module 170 will be explained. The SIM module 170 may generate a key used for encrypting and decrypting voice data, and may perform authentication. The SIM module 170 may perform an Authentication and Key Agreement (AKA) process, and the electronic device 101 may provide an encryption and authentication service for user data by using a cipher key generated during this process. It is mandatory for the SIM module 170 to provide a random number generation algorithm for authentication and key agreement, a function for generating an XMAC for network authentication, a re-synchronization authentication function, a user authentication function for generating a user RESponse (RES), a function for generation a Cipher Key (CK), and a function f4 for generating an Integrity Key (IK). An Anonymity Key (AK) generation function, an AK derivation function for re-synchronizing, and a function for providing compatibility with a SIM module of a different scheme may be optionally needed. In addition, the electronic device 101 may have an algorithm kernel (KASUMI), an encryption algorithm, and an authentication algorithm embedded therein. When the electronic device 101 introduces itself by transmitting its own Temporary Mobile Subscriber Identity (TMSI) or International Mobile Subscriber Identity (IMSI) to a Visitor Location Register (VLR) to authenticate, the VLR may transmit an authentication data request message and the IMSI/TMSI received from the electronic device 101 to an Authentication Center (AuC). The authentication center may generate an Authentication Vector (AV) for the received IMSI and may transmit the AV to the VLR in response to the authentication data request. The VLR may select one of the stored authentication vectors, generate a random number, extract an Authentication Token (AUTN) from the authentication vector, and try to request the electronic device 101 to authenticate the user. The electronic device 101 may finish authenticating the data by using a network authentication algorithm of the SIM module 170 and transmit a user authentication response for authenticating the user to the VLR, and may generate encryption session keys (CK and IK). The VLR authenticates the electronic device 101 and the user by comparing the received RES and the X-Ray Emission Spectroscopy (XRES) stored in the VLR, and then finishes the authentication and key agreement by generating a session key to be used to encrypt the user data. When key sharing and authentication are completed in this way, confidentiality and integrity can be provided to a wireless section by using a synchronous stream cipher algorithm for encrypting user data and an algorithm for verifying traffic integrity, which are mounted in a terminal and a Radio Network Control (RNC). The electronic device 101 may be responsible for encrypting user data and providing integrity, and the SIM module 170 may perform a key generation process including an authentication process. The operation of establishing a communication environment in the electronic device 101 based on SIM information of the SIM module 170 may be performed as described above.

The electronic device 101 may receive SIM information to be stored in the SIM module 170 via a designated communication and may store the SIM information in the memory 230 of the SIM module 170. According to an embodiment of the present disclosure, when user identification information registered at a telecommunications business operator designated in the SIM module 170 of the electronic device 101 is to be stored in the SIM module 170 of the electronic device 101, the electronic device 101 may transmit an identification code and a security key of the registered user in a user Over the Air (OTA) method. The electronic device 101 may receive user identification information (e.g., SIM information) as a response to the transmitted OTA and may activate the user identification information, and may store the user identification information in the memory 230 of the SIM module 170. The processor 220 of the SIM module 170 may store location of the stored SIM information and information on the telecommunications business operator in the metadata of the SIM module 170. The electronic device 101 may activate or deactivate one or more pieces of SIM information stored in the SIM module 170 through the second processor 220, and may store information on activation or deactivation in the metadata of the SIM module 170.

Figure 3A:
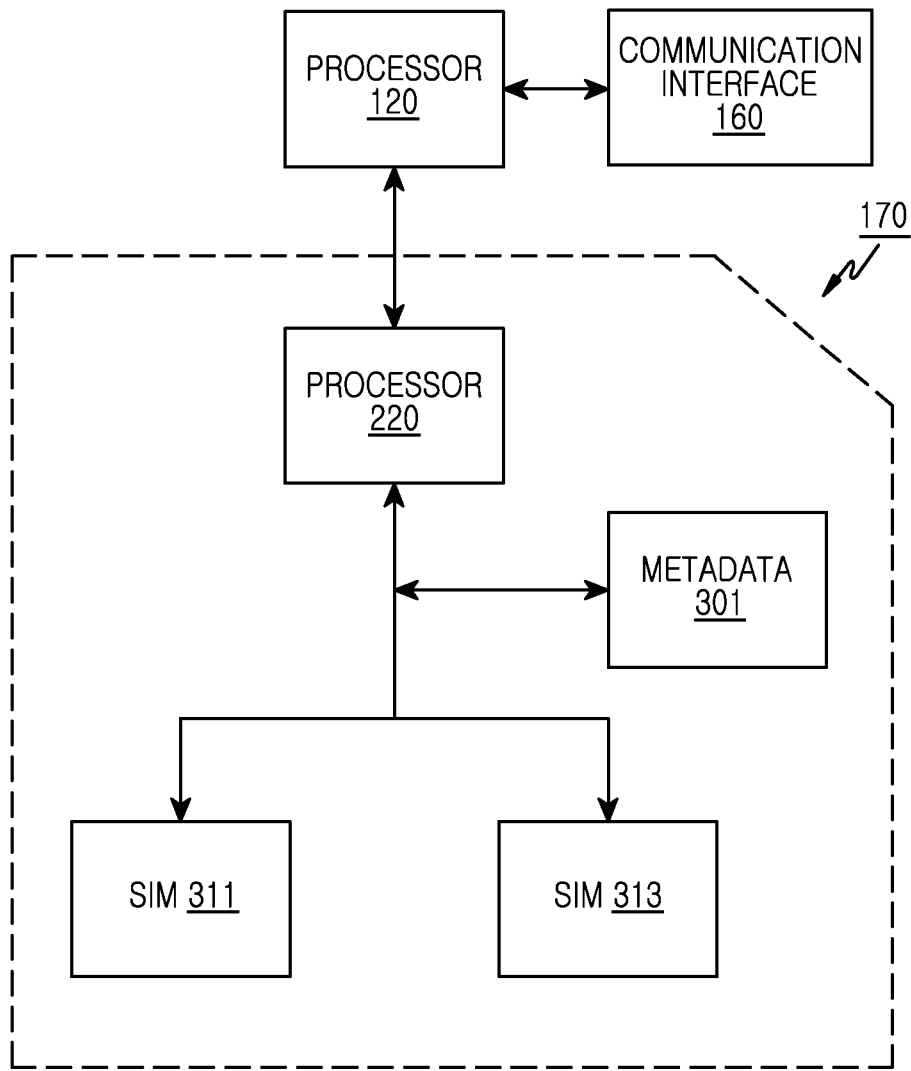
FIGS. 3A, 3B and 3C illustrate an operation of processing two or more pieces of SIM information in an electronic device according to various embodiments of the present disclosure.
Figure 3B:
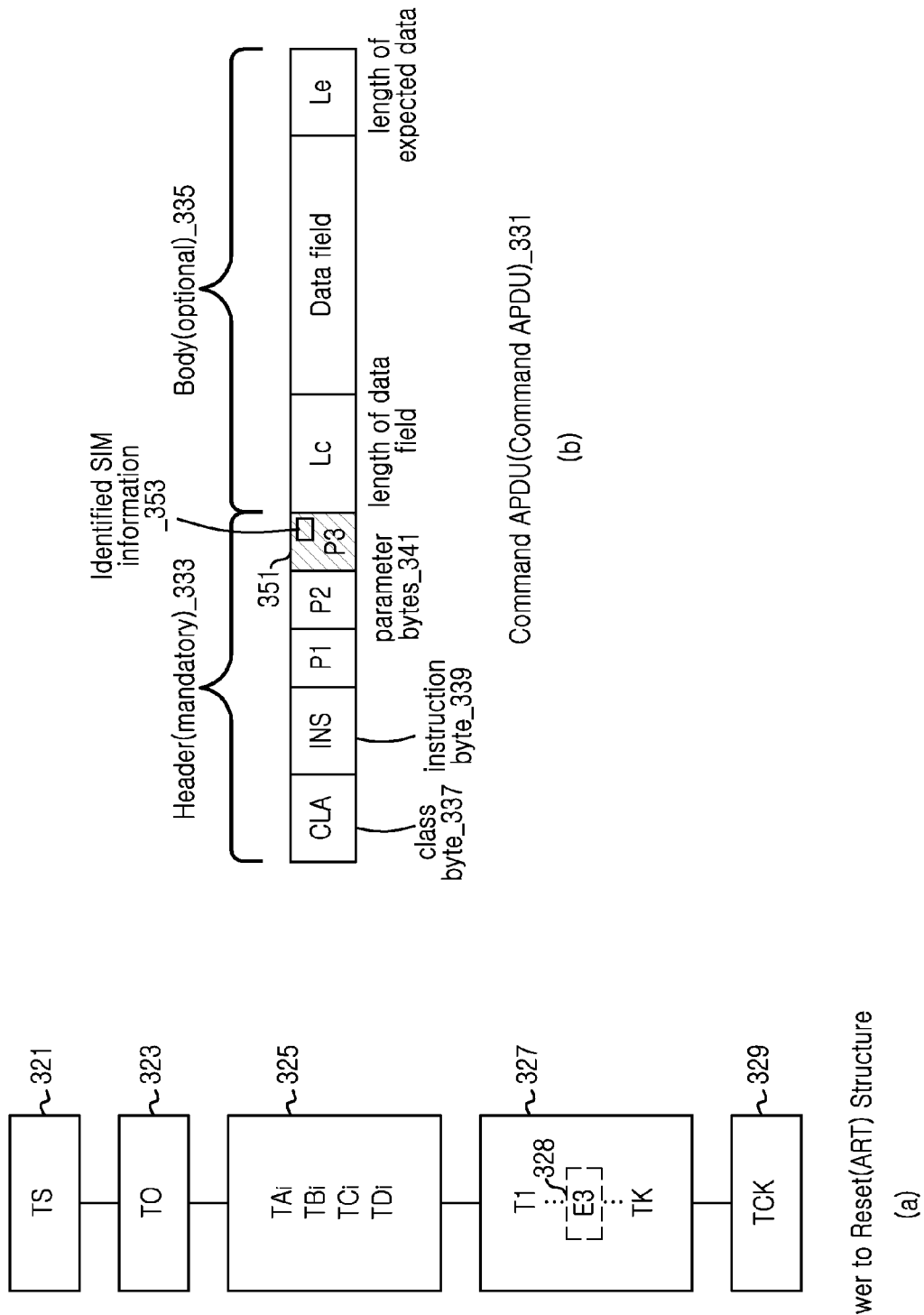
Figure 3C:
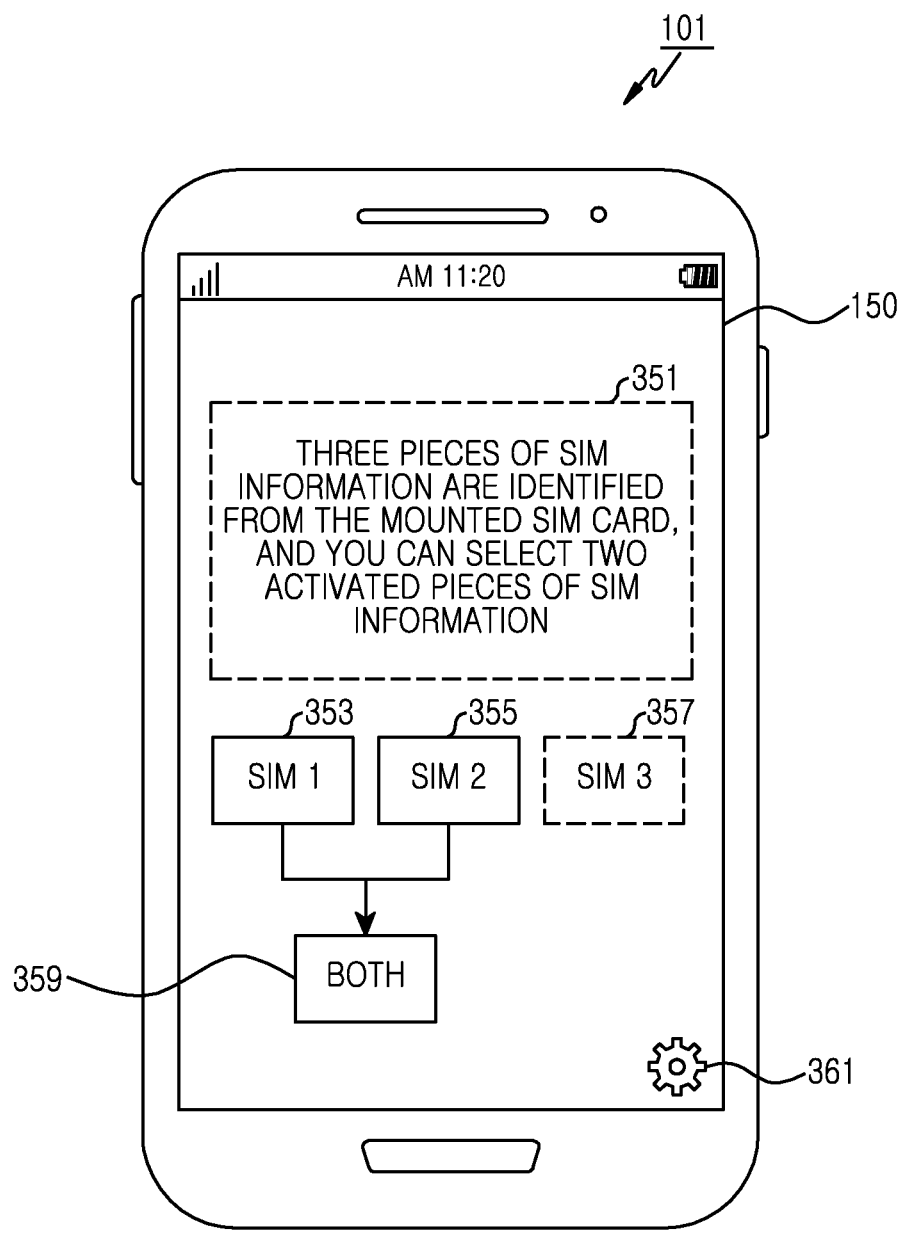

FIGS. 3A, 3B and 3C illustrate an operation of processing two or more pieces of SIM information in an electronic device according to various embodiments of the present disclosure.

The electronic device 101 may receive SIM information stored in the memory 230 of the SIM module 170 from the second processor 220 of the SIM module 170, and, when it is possible to establish multiple communication environments in the electronic device 101, the electronic device 101 may establish two or more communication environments based on two or more pieces of SIM information acquired from the second processor 220 of the SIM module 170.

Hereinafter, various embodiments of the present disclosure will be explained with reference to FIG. 3A.

Referring to FIG. 3A, the first processor 120 of the electronic device 101 may acquire two or more pieces of SIM information included in the SIM module 170 through the second processor 220 of the SIM module 170. According to an embodiment of the present disclosure, when a gesture designated in the electronic device (e.g., a user input to supply power to the turned-off electronic device 101) is performed, the SIM module 170 may identify two or more pieces of SIM information included in the SIM module 170 with reference to metadata 301. The second processor 220 may identify that two pieces of SIM information, first SIM information 311 and second SIM information 313, are included in the SIM module with reference to the metadata 301 of the SIM module 170. The second processor 220 may transmit information indicating that it is possible to establish communication environments for two pieces of SIM information to the first processor 120 of the electronic device 101. The first processor 120 of the electronic device 101 may transmit setting instructions regarding the state where it is possible to establish communication environments for the two pieces of SIM information to the second processor 220, and the second processor 220 may set the communication environments in the electronic device 101 based on the first SIM information 311 and the second SIM information 313. According to an embodiment of the present disclosure, in loading the first SIM information 311 and the second SIM information 313 included in the SIM module 170, security environments may be set for the first SIM information 311 or the second SIM information 313 (e.g., a Personal Identification Number (PIN) code is set). When SIM information in which a PIN code is set is loaded, the second processor 220 may request the first processor 120 to output a menu for inputting a designated PIN code. When it is determined that a correct PIN code is input, the second processor 220 may set a corresponding communication environment in the electronic device 101 based on corresponding SIM information. In setting the communication environment in the electronic device 101, the second processor 220 may perform a communication authentication process or a communication test process with other electronic devices through the communication interface 160 of the electronic device 101, or may request the first electronic device 101 to perform the communication authentication process or the communication test process through the communication interface 160.

Hereinafter, various embodiments of the present disclosure will be explained with reference to FIG. 3B.

Referring to view (a) of FIG. 3B, the second processor included in the SIM module 170 may transmit SIM information included in the SIM module 170 and activatable SIM information to the processor 120 of the electronic device 101 with reference to metadata (e.g., 310 of FIG. 3A). According to an embodiment of the present disclosure, the second processor 220 may inform that the second processor 220 is prepared to establish a communication environment in the electronic device 101 based on SIM information included in the SIM module 170 through Answer To Reset (ATR). The ATR may include information on performance capability of the SIM module 170. Hereinafter, an ATR structure will be explained with reference to view (a) of FIG. 3B.

TS indicating an initial character 321 may show in which format the electronic device 101, which communicates with the SIM module 170, receives next data, and TO indicating a format character 323 may show presence/absence of next ATR bytes. Interface characters 325 may include information on capability of using a T=0 or T=1 protocol and parameter negotiation information, and historical characters 327 may be used for the electronic device 101 to grasp characteristics of the SIM module 170, such as an operating system version of the SIM module 170. When the SIM module 170 includes two or more pieces of SIM information, the SIM information and information on activatability may be included in the historical characters 327 and may be transmitted to the electronic device 101. According to an embodiment of the present disclosure, when two or more pieces of SIM information are included in the SIM module 170, the second processor 220 may define multiple running SIM (E, enable) and two activatable SIMs as E2, and may include them in the historical characters 327. For example, referring to view (a) of FIG. 3B, when three pieces of SIM information are included in the SIM module 170, the second processor 220 may define multiple running SIM (E, enable) and three activatable SIMs as E3 328 and may include them in the historical characters 327. A check character 329 may be a check sum for all bytes in the ATR and may be used to identify a transmission error. A transmission protocol of the SIM module 170, which is determined by TDi of the interface characters 325, may be defined as a T=0 protocol and a T=1 protocol. The T=0 protocol may fix a command Application Protocol Data Unit (APDU) to 5 bytes by using a simple byte unit transmission technology and may transmit the command APDU to the SIM module 170, and the T=1 protocol may transmit the APDU in the unit of a block. When TA1 of the interface characters, which are the third field of the ATR, is not 11, the electronic device 101 may convert the transmission protocol responded by the SIM module 170 into another transmission protocol through a Protocol and Parameter Selection (PPS) procedure. The electronic device 101, which wishes to request PPS, may transmit PPSS (e.g., an initial character) and PPS0 (e.g., a format character) 2 bytes, and parameter attribute values (PPS1, PPS2, and PPS3) and PCK (e.g., a check character) to the SIM module 170, and, when the same response is received regarding these from the SIM module 170, the PPS is successfully completed. When exchange of the ATR and the PPS process are completed, the SIM module 170 and the electronic device 101 may transmit and receive cipher information through a command and a response.

Referring to view (b) of FIG. 3B, the command and response exchanged between the electronic device 101 and the SIM module 170 may conform to the APDU format defined by ISO/IEC 7816-4 and ISO/IEC 7816-8. The APDU may be divided into a command APDU 331 of the electronic device 101 and a response APDU of the SIM module 170 to respond to the command APDU 331. The electronic device 101 may transmit the command APDU 331 including two or more pieces of SIM information which can be activated in the SIM module 170 to the SIM module 170 based on ATR received from the SIM module 170, and the SIM module 170 may transmit the response APDU for identifying the two or more pieces of SIM information to the electronic device 101. Hereinafter, the APDU structure will be explained with reference to view (b) of FIG. 3B.

The command APDU 331 may be divided into a header 333 which needs to be transmitted and a body 335 which is filled with fields of data according to presence/absence of data to be transmitted or received, and the entire data of the body 335 varies according to a kind of command. CLA 337 and INS 339 indicating a kind of command, and P1/P2 341 indicating 1 byte and parameters of the command belong to the header 333 of the command APDU 331, and the body 335 may be comprised of Lc indicating a length of data to be transmitted to the SIM module 170, data corresponding to the length of the data, and Le indicating a length of data to be received by the electronic device 101.

The electronic device 101 may include SIM information 353 identified by the ATR (e.g., SIM information included in the received ATR) in parameter bytes 341 of the command APDU 331 and may transmit the SIM information to the SIM module 170, in order to establish communication environments corresponding to two or more pieces of SIM information in the electronic device 101 based on the information of the ATR received from the SIM module 170. According to an embodiment of the present disclosure, in including the SIM information 353 identified by the ATR, the electronic device 101 may include the SIM information in some of the areas (e.g., P1 and/or P2) included in the parameter bytes 341 of the command APDU 331, and may transmit the SIM information. However, the command APDU 331 may include a separate area (e.g., P3 351) for including the identified SIM information 353. For example, the electronic device 101 may change the area of the parameter bytes 341 of the command APDU 331 which is divided into P1 and P2 (e.g., into P1, P2, and P3 351) to configure the P3 area 351 to include the identified SIM information 353. In addition, the electronic device 101 may not be limited to changing the configuration of the area of the parameter bytes 341 (e.g., from the configuration of P1 and P2 into the configuration of P1, P2, and P3 351), and may include the P3 area 351 in at least part of the area of P1 and/or P2. In addition, in including the SIM information in the command APDU 331, the electronic device 101 includes the SIM information in the parameter bytes 341. However, this should not be considered as limiting. The electronic device 101 may include the SIM information in some area of the command APDU 331 structure. According to an embodiment of the present disclosure, when the identified SIM information 353 is included in the header 333, the electronic device 101 may include the identified SIM information 353 by using an empty space of class byte 337 or instruction byte 339. In addition, as described above, the electronic device 101 may configure the P3 area 351 for including the identified SIM information 353 in the class byte 337 or the instruction byte 339 in the class byte 337 or instruction byte 339. The second processor 220 may identify the command APDU 331 received from the electronic device 101 through the SIM module 170, and may establish a communication environment corresponding to the identified SIM information 353 which is included in the received command APDU 331 in the electronic device 101. The response APDU may be comprised of a data field which is determined to be transmitted or not to be transmitted according to a kind of command APDU 331, and a state word of 2 bytes informing a result of processing a command. When the T=0 transmission protocol is used, the command APDU 331 may be split into 5 bytes and transmitted.

Hereinafter, various embodiments of the present disclosure will be explained with reference to FIG. 3C.

Referring to FIG. 3C, when the electronic device 101 identifies two or more pieces of SIM information included in the SIM module 170 as described above, the electronic device 101 may establish two or more communication environments in the electronic device 101 through the second processor 220 of the SIM module 170. During the process of establishing the two or more communication environments, the electronic device 101 may refer to the metadata (e.g., 301 of FIG. 3A) of the SIM module 170, and may display the two or more pieces of SIM information on the display 150 of the electronic device 101. In an embodiment of the present disclosure in which the electronic device 101 identifies information included in the metadata of the SIM module 170, the electronic device 101 may identify the information through ATR information received from the SIM module 170. The electronic device 101 may acquire three pieces of SIM information (e.g., first SIM information 353, second SIM information 355, and third SIM information 357) from the SIM module 170, and may display a designated message 351 on a display of the electronic device 101 based on the acquired SIM information. In displaying the acquired SIM information on the display 1560, the electronic device 101 may distinguish between activated SIM information (e.g., the first SIM information 353 and the second SIM information 355) for establishing communication environments and deactivated SIM information (e.g., the third SIM information 357). In addition, the electronic device 101 may display a list 359 for selecting all of the activated first SIM information 353 and second SIM information 355. The electronic device 101 may distinguish between the activated SIM information (e.g., the first SIM information 353 and the second SIM information 355) for establishing communication networks and the deactivated SIM information (e.g., the third SIM information 357) according to a location of the electronic device 101 (e.g., a designated location of an area where telecommunications business operators can be distinguished, such as a country a city, and the like) or user's selection. According to an embodiment of the present disclosure, the electronic device 101 may include 'T-Mobile (e.g., the first SIM information 353)' and 'Verizon (e.g., the second SIM information 355)', which are telecommunication companies in the U.S., and 'ROGERS (e.g., the third SIM information 357)', which is a telecommunication company in Canada, in the SIM module 170. The electronic device 101 may determine a location of the electronic device 101 at the time of establishing the communication environments. According to an embodiment of the present disclosure, the electronic device 101 may determine the location of the electronic device 101 through measurement using a Global Positioning System (GPS), measurement using a short-range wireless communication device, such as WiFi, measurement using a base station of a cellular communication, user's selection, and the like. For example, when the location of the electronic device 101 is determined through measurement using the base station of the cellular communication, the electronic device 101 may determine the location of the electronic device 101 based on identification information indicating the location, such as a Public Land Mobile Network (PLMN) received from the base station connected via a network in the location of the electronic device 101. When the U.S. is determined as the location of the network device 101, the electronic device 101 may display 'T-Mobile (e.g., the first SIM information 353)' and 'Verizon (e.g., the second SIM information 355)', which correspond to telecommunications companies in the U.S., in an activated state, and may display 'ROGERS (e.g., the third SIM information 357)', which is a telecommunications company in Canada, in a deactivated state. The electronic device 101 may establish a communication environment corresponding to selected SIM information according to at least one piece of SIM information selected form displayed SIM information. According to an embodiment of the present disclosure, when it is detected that 'T-Mobile (e.g., the first SIM information 353)' and 'Verizon (e.g., the second SIM information 355)' are selected from the displayed SIM information, or when it is detected that a function for selecting the activated SIM information (e.g., the first SIM information 353 corresponding to 'T Mobile' and second SIM information 355 corresponding to 'Verizon') (e.g., the list 359) is selected, the electronic device 101 may establish a communication environment where the communication environment of 'T-Mobile' and the communication environment of 'Verizon' reside at the same time. The electronic device 101 may automatically establish the communication environments based on the metadata of the SIM module 170 with reference to the information of the ATR received from the SIM module 170, without selecting SIM information to be loaded into the electronic device 101 from the two or more pieces of SIM information included in the SIM module 170. According to an embodiment of the present disclosure, the electronic device 101 may refer to the information of the ATR received from the SIM module 170, and may establish a communication environment where the communication environment of 'T-Mobile' and the communication environment of 'Verizon' reside at the same time in the electronic device 101 based on the activated SIM information (e.g., the first SIM information 353 corresponding to 'T-Mobile' and the second SIM information 355 corresponding to 'Verizon') of the SIM module 170. The electronic device 101 may provide a setting environment 361 for setting a method for establishing a communication environment based on two or more pieces of SIM information included in the SIM module 170. According to an embodiment of the present disclosure, the operation performed in FIG. 3C may be an operation performed based on information set through the setting environment 361. The electronic device 101 may communicate via at least one communication environment corresponding to the location of the electronic device 101 in the two or more set communication environments.

Figure 4A:
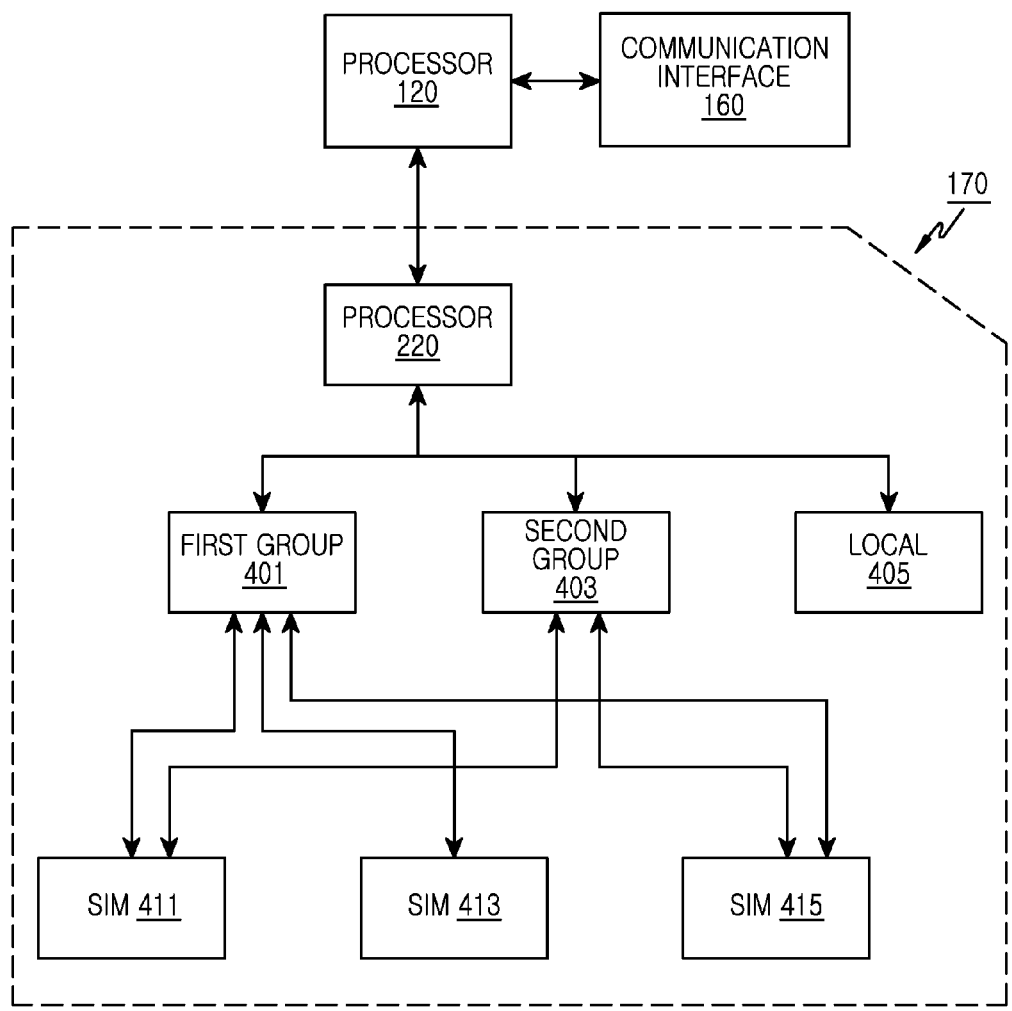
FIGS. 4A and 4B illustrate an operation of processing two or more pieces of SIM information in an electronic device according to various embodiments of the present disclosure.
Figure 4B:
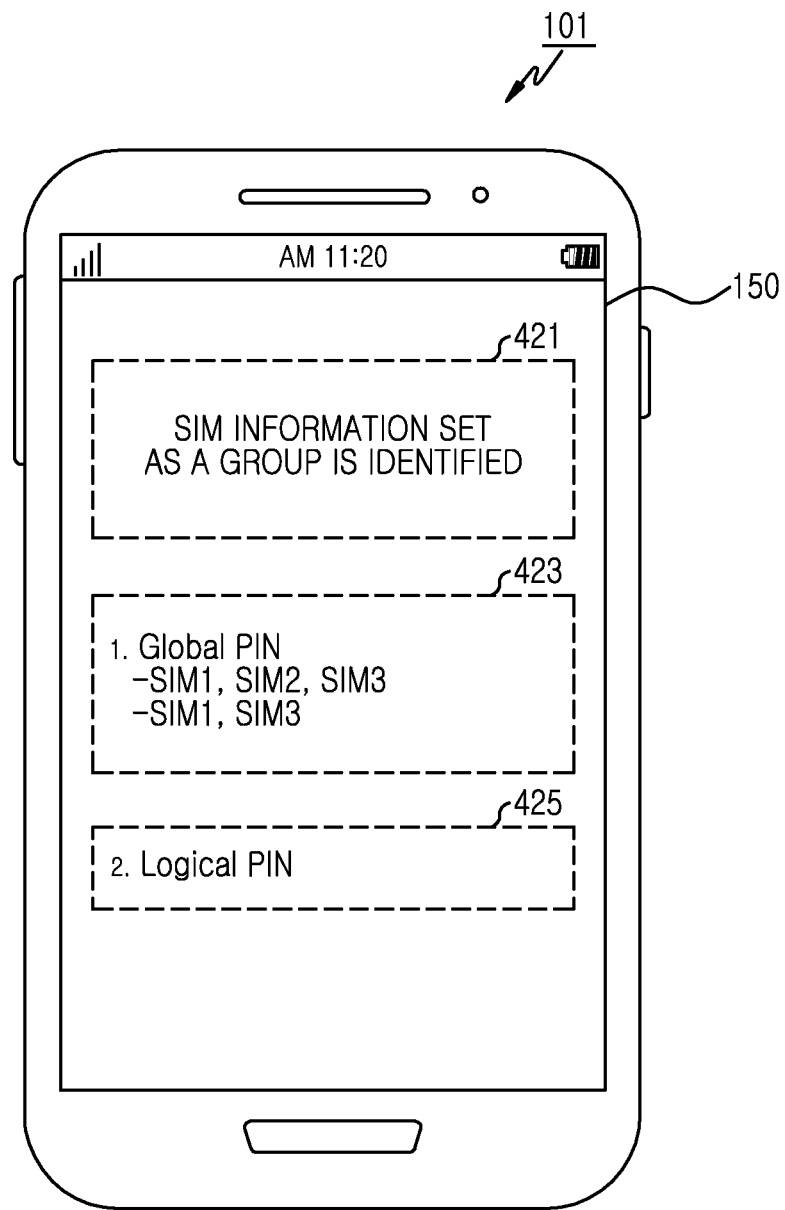

FIGS. 4A and 4B illustrate an operation of processing two or more pieces of SIM information in an electronic device according to various embodiments of the present disclosure.

The electronic device 101 may receive SIM information included in the memory 230 of the SIM module 170 from the second processor 220 of the SIM module 170, and the SIM information included in the SIM module 170 may be included in one or more groups (e.g., a SIM group). Information on the configured SIM group may be stored in metadata of the SIM module 170, and may be processed by the second processor 220.

Hereinafter, various embodiments of the present disclosure will be explained with reference to FIG. 4A.

Referring to FIG. 4A, the SIM module 170 may include two or more pieces of SIM information. Among the SIM information, one or more pieces of SIM information may be included in a SIM group. Information on the SIM group may be stored in a designated area of the memory of the SIM module 170, and the designated area may be metadata (e.g., 301 of FIG. 3A). The electronic device 101 may include a first SIM group 401 and a second SIM group 403 in the SIM module 170. The first SIM group may include first SIM information 411, second SIM information 413, and third SIM information 415 included in the SIM module 170, and the second SIM group 403 may include the first SIM information 411 and the third SIM information 415. When a designated input (e.g., an input to supply power to the turned off electronic device 101) is detected, the second processor 220 may refer to the metadata of the SIM module 170 and may transmit to the first processor 120 of the electronic device 101 the SIM information included in the SIM module 170 or activated SIM information which can establish a communication environment according to SIM information through ATR. When transmitting the SIM information included in the SIM module 170, the second processor 220 may also transmit information on the SIM group including one or more pieces of SIM information. When transmitting the SIM information to the first processor 120, the second processor 220 may transmit each piece of SIM information (e.g., the first SIM information 411, the second SIM information 413, and the third SIM information 415) as activatable SIM information in addition to the SIM information included in the SIM group, like a local 405. The electronic device 101 may establish communication environments corresponding to a SIM group selected based on the metadata included in the SIM module 170 (e.g., the first SIM group 401 or second SIM group 403) or SIM information selected according to SIM information corresponding to the local 405 in the electronic device 101. According to an embodiment of the present disclosure, when the first SIM information 401 is selected, the electronic device 101 may request the second processor 220 to establish communication environments for the first SIM information 411, the second SIM information 413, and the third SIM information 415 included in the first SIM group 401. The SIM module 170 may set a security environment (e.g., a PIN code) for one or more SIM groups. When a correct PIN code set for the SIM group is input, the electronic device 101 may establish a communication environment of each piece of SIM information included in the corresponding SIM group in the electronic device 101.

Hereinafter, various embodiments of the present disclosure will be explained with reference to FIG. 4B.

Referring to FIG. 4B, when a designated input (an input to supply power to the turned off electronic device 101) is detected, the electronic device 101 may identify SIM information included in metadata of the SIM module 170. When it is identified that two or more pieces of SIM information included in the SIM module 170 are set as a group 421, the electronic device 101 may display the corresponding group on the display 150 of the electronic device 101. When the SIM information is classified into the first SIM group 410 and the second SIM group 403 as shown in FIG. 4A, the electronic device 101 may display a corresponding SIM group and/or SIM information included in the SIM group 423. The electronic device 101 may display a menu 425 for selecting SIM information to be activated without selecting a SIM group like the local 405 of FIG. 4A. The electronic device 101 may set a security environment for a SIM group which includes two or more pieces of SIM information, and may set identification information, such as a PIN code, as a security key for the security environment. When the first SIM group 401 in which security is set is selected and a corresponding security key is input, the electronic device 101 may establish communication environments corresponding to the first SIM information 411, the second SIM information 413, and the third SIM information 415 included in the first SIM group 401 in the electronic device 101.

The electronic device 101 may automatically establish the communication environments according to information set in the electronic device 101 with reference to metadata included in the SIM module 170, without selecting one or more groups from among the two or more SIM groups. According to an embodiment of the present disclosure, when settings for one SIM group are included in the metadata of the SIM module 170, the electronic device 101 may establish communication environments corresponding to two or more pieces of SIM information included in the SIM group in the electronic device 101. In addition, when priority is given to two or more SIM groups, the electronic device 101 may establish communication environments corresponding to SIM information included in a high priority SIM group in the electronic device 101 with reference to the metadata included in the SIM module 170.

Figure 5:
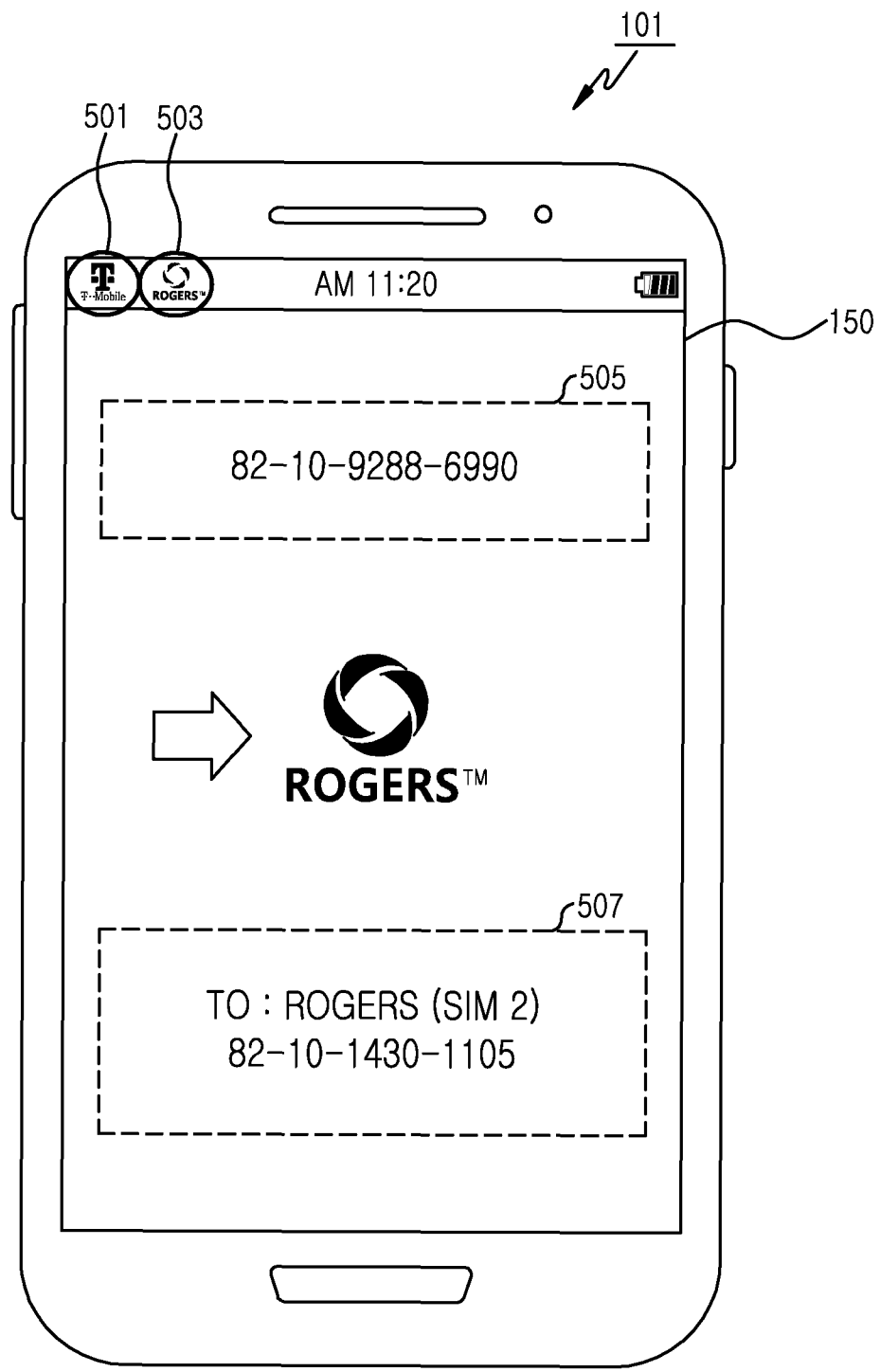
FIG. 5 illustrates a an operation when communication environments corresponding two or more pieces of SIM information are established in an electronic device according to various embodiments of the present disclosure.

FIG. 5 illustrates an operation when communication environments corresponding to two or more pieces of SIM information are established in an electronic device according to various embodiments of the present disclosure.

Referring to FIG. 5, the electronic device 101 may establish two or more communication environments in the electronic device 101 based on two or more pieces of SIM information included in the SIM module 170. The two or more communication environments established in the electronic device 101 may operate in a standby state simultaneously. According to an embodiment of the present disclosure, the SIM module 170 of the electronic device 101 may include first SIM information registered at the telecommunications company 'T-Mobile', and second SIM information registered at the telecommunications company 'ROGERS'. The electronic device 101 supplies power in an off-state and may establish multiple communication environments in the electronic device 101 according to the first SIM information and the second SIM information included in the SIM module 170. The electronic device 101 may display a state in which the communication environments corresponding to the first SIM information of 'T-Mobile' and the second SIM information of 'ROGERS' are established in the electronic device 101 on the display which displays a communication connection state of the electronic device 101 (e.g., 'T-MOBILE 501' and 'ROGERS 503'. When the electronic device 101 establishes the multiple communication environments and receives a designated communication in the standby state, the electronic device 101 may display information on the communication environment where the communication is received. According to an embodiment of the present disclosure, when there is a request to connect a communication to communication identification information of the activated second SIM information, '82-10-1430-1105', from communication identification information of '82-10-9288-6990', the electronic device 101 may display communication identification information 505 of '82-10-9288-6990' which requested communication connection on the display 150, and may display communication identification information 507 of '82-10-1430-1105' (or the second SIM information, ROGERS) that received communication connection from among the multiple communication environments set in the electronic device 101.

According to various embodiments of the present disclosure, when the electronic device 101 requests communication connection with another electronic device, the electronic device 101 may provide an option of selecting one of the multiple communication environments (e.g., 'T-Mobile' and 'ROGERS') established in the electronic device 101. The electronic device 101 may select one of the multiple communication environments according to user's selection at the time of connecting communication or based on set information. In determining a communication environment based on set information, the electronic device 10 may determine to communicate in a communication environment corresponding to a location of the electronic device 101 or may determine to communicate in a communication environment designated according to a communication type.

According to an embodiment of the present disclosure, the electronic device 10 may have established a communication environment of 'T-Mobile', which is a telecommunications company in the U.S., and a communication environment of 'ROGERS', which is a telecommunications company in Canada. The electronic device 101 may transmit or receive data in the communication environment of 'T Mobile' and may receive or transmit a voice communication in the communication environment of 'ROGERS', based on set information. In addition, when the electronic device 101 is located in the U.S., the electronic device 101 may determine to communicate (at least one of data communication, calling or receiving) through 'T Mobile', which is a telecommunications company in the U.S., based on set information, and when the electronic device 101 is located in Canada, the electronic device 101 may determine to communicate through 'ROGERS', which is a telecommunications company in Canada, based on set information. The set information may be information that is stored in the memory 130 in response to a user's determination based on a setting environment provided by the electronic device 101 in relation to the SIM module 170. In addition, when it is impossible to connect a communication in the selected communication environment, the electronic device 101 may provide an option of connecting the communication in another communication environment established in the electronic device 101.

Figure 6:
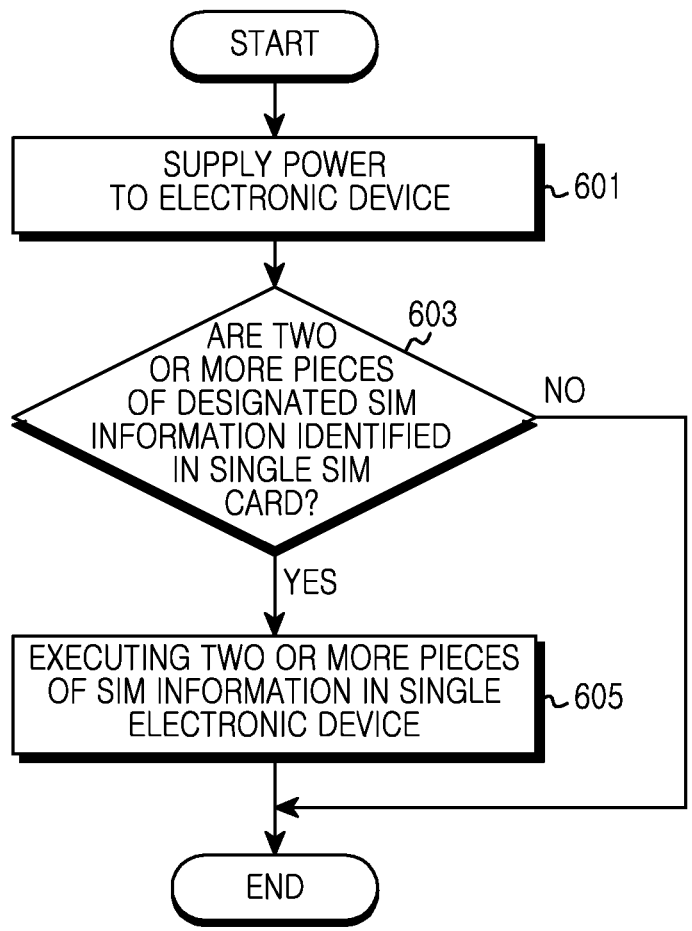
FIG. 6 is a flowchart illustrating an operation of processing two or more pieces of SIM information in an electronic device according to various embodiments of the present disclosure.

FIG. 6 is a flowchart illustrating an operation of processing two or more pieces of SIM information in an electronic device according to various embodiments of the present disclosure.

Referring to FIG. 6, when a designated input is detected, the electronic device 101 may establish communication environments corresponding to two or more pieces of SIM information included in the SIM module 170 in the electronic device 101. Hereinafter, each operation illustrated in FIG. 6 will be explained.

At operation 601, the electronic device 101 may detect a designated input. The electronic device 101 may detect a designated input for controlling to establish designated communication environments in the electronic device according to SIM information included in the SIM module 170 during the operation of the electronic device 101. According to an embodiment of the present disclosure, the designated input may be an input for supplying power to the turned off electronic device 101. According to another embodiment of the present disclosure, the electronic device 101 may include a SIM module 170 including multiple pieces of SIM information and may detect a designated input for loading other communication environments included in the SIM module 170 during the operation of electronic device 101 in which a single communication environment is established. The electronic device 101 may detect a designated input for loading SIM information which is not established in the electronic device 101 in which communication environments corresponding to some of the multiple pieces of SIM information included in the SIM module 170 are established.

At operation 603, the electronic device 101 may identify two or more pieces of SIM information included in the SIM module 170. According to an embodiment of the present disclosure, when power is supplied to the turned off electronic device 101, the electronic device 101 (or the first processor 120) may receive two or more pieces of SIM information included in the SIM module 170 through the second processor 220 of the SIM module 170. In addition, when a SIM group including two or more pieces of SIM information from among the multiple pieces of SIM information included in the SIM module 170 is stored, the electronic device 101 may receive information on the corresponding SIM group. In transmitting SIM information to the electronic device 101, the second processor 220 may refer to information of metadata included in the SIM module 170. When the electronic device 101 identifies the two or more pieces of SIM information from the SIM module 170, operation 603 may be performed, and when a single piece of SIM information is identified from the SIM module 170, the embodiment of FIG. 6 may be finished.

Referring to operation 605, the electronic device 101 may process to establish two or more communication environments in the electronic device 101 based on the SIM information received from the SIM module 170. According to an embodiment of the present disclosure, the first processor 120 of the electronic device 101 may control the communication interface 160 included in the electronic device 101 according to a request of the SIM module 220, and, when a security environment is set for SIM information or a SIM group including SIM information according to information stored in the metadata of the SIM module 170, the first processor 120 may display a screen configuration for requesting to input a security environment on the display 150. The electronic device 101 may establish a communication environment corresponding to each of the multiple pieces of SIM information in the electronic device 101 according to information stored in the metadata of the SIM module 170. When priority to connect is given to the SIM information and is stored in the metadata of the SIM module 170, the electronic device 101 may establish the communication environments in sequence according to priority.

The electronic device 101 may finish the embodiment of FIG. 6 when operation 605 is performed.

Figure 7:
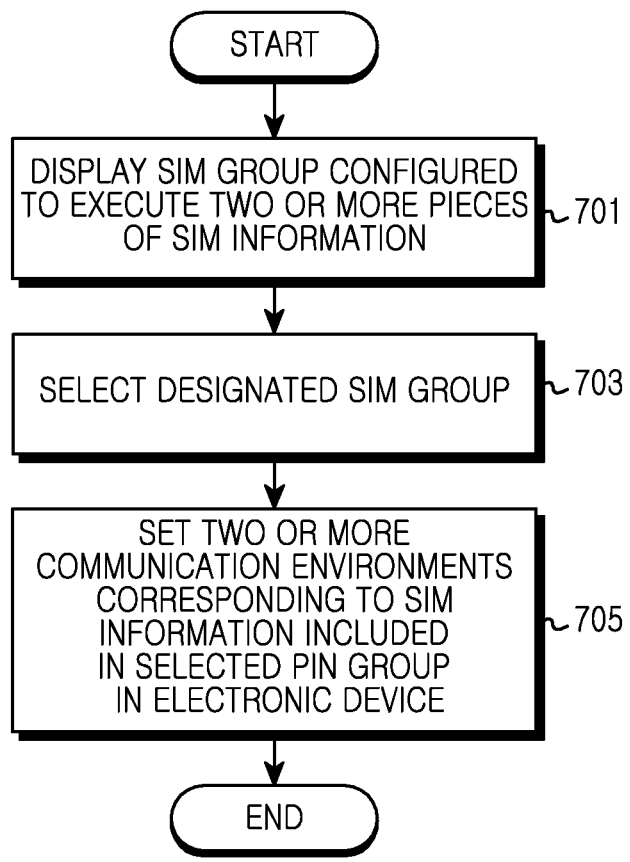
FIG. 7 is a flowchart illustrating an operation of processing two or more pieces of SIM information in an electronic device according to various embodiments of the present disclosure.

FIG. 7 is a flowchart illustrating an operation of processing two or more pieces of SIM information in an electronic device according to various embodiments of the present disclosure.

Referring to FIG. 7, the electronic device 101 may designate multiple pieces of SIM information from among two or more pieces of SIM information included in the SIM module 170, and may set them as a group. When two or more groups are provided, the electronic device 101 may select one or two or more groups and may establish a communication environment corresponding to each piece of SIM information included in the selected group in the electronic device 101.

At operation 701, the electronic device 101 may identify two or more pieces of SIM information included in the SIM module 170 with reference to metadata of the SIM module 170. The electronic device 101 may identify SIM information that is included in one or more SIM groups and stored from among the two or more pieces of SIM information. In addition, the electronic device 101 may identify a SIM group including SIM information with reference to metadata of the SIM module 170. The electronic device 101 may receive information on the SIM group from the SIM module 170 and may display the SIM group on the display 150. When displaying one or more SIM groups on the display 150, the electronic device 101 may display a menu for selecting each piece of SIM information included in the SIM module 170.

At operation 703, the electronic device 101 may determine SIM information or a SIM group including SIM information for establishing a communication environment. According to an embodiment of the present disclosure, the electronic device 101 may select a SIM group including first SIM information and second SIM information with reference to information displayed on the display 150 based on the metadata of the SIM module 170. According to an embodiment of the present disclosure, when a security key is set for the selected SIM group, the electronic device 101 may provide a menu for inputting a security key, and, when a correct security key is input, the electronic device 101 may control to establish communication environments according to the first SIM information and the second SIM information included in the SIM group.

At operation 705, the electronic device 101 may establish a communication environment of the first SIM information and a communication environment of the second SIM information according to the first SIM information and the second SIM information included in the selected SIM information. The electronic device 101 may perform a communication corresponding to the communication environment of the first SIM information and a communication corresponding to the communication environment of the second SIM information in the single electronic device 101 altogether.

The electronic device 101 may finish the embodiment of FIG. 7 when operation 705 is performed.

According to various embodiments of the present disclosure, a method for setting a communication environment of an electronic device may include: detecting a user's input and selecting two or more pieces of information from among multiple pieces of user identification information included in a single SIM module, and determining communication environments corresponding to the two or more pieces of user identification information. The communication environments may be loaded into the electronic device all together.

According to an embodiment of the present disclosure, the SIM module may include information on one or more groups including the user identification information. According to an embodiment of the present disclosure, the information on the group may be included in metadata of the SIM module. According to an embodiment of the present disclosure, the two or more pieces of user identification information may be user identification information included in one group selected from the groups. According to an embodiment of the present disclosure, when security is set for the user identification information and a designated security key is input, the selecting is completed. According to an embodiment of the present disclosure, the communication environments may perform communication functions corresponding to the two or more pieces of user identification information independently in the electronic device. According to an embodiment of the present disclosure, the selecting may include automatically selecting based on metadata of the SIM module. According to an embodiment of the present disclosure, the method may further include displaying the user identification information which is communicating in the communication environments. According to an embodiment of the present disclosure, the method may further include communicating via at least one communication environment corresponding to a location of the electronic device from among the loaded two or more communication environments.

Various embodiments of the present disclosure may be performed by at least one of one or more programs included in the memory of the electronic device 101, one or more processors (e.g., the processor 120), and the SIM module 170. Each of the above-described elements of the electronic device according to various embodiments of the present disclosure may be configured as one or more components, and the name of each element may vary according to a kind of electronic device. The electronic device according to various embodiments of the present disclosure may include at least one of the above-described elements, and some of the elements may be omitted or an additional element may be further included. In addition, some of the elements of the electronic device according to various embodiments of the present disclosure may be combined into a single entity, and may perform the same functions as those of the elements before being combined.

According to various embodiments of the present disclosure, an electronic device may include a first memory configured to store user identification information corresponding to a set communication environment, a single SIM module configured to detect a user's input and select two or more pieces of information from among multiple pieces of user identification information, determine communication environments corresponding to the two or more pieces of user identification information, and process to load the communication environments into the electronic device all together and communicate independently, and one or more first processors configured to control the SIM module.

According to an embodiment of the present disclosure, the SIM module may include a second memory including the multiple pieces of user identification information and metadata, and a second processor configured to determine the communication environments corresponding to the user identification information. According to an embodiment of the present disclosure, the SIM module may exchange the user identification information with the first processor. According to an embodiment of the present disclosure, the SIM module may transmit information on one or more groups including the user identification information to the first processor. According to an embodiment of the present disclosure, the SIM module may include metadata including information on the group which designates two or more pieces of information from among the multiple pieces of user identification information and includes the two or more pieces of user identification information. According to an embodiment of the present disclosure, the SIM module may select the two or more pieces of user identification information included in a single group selected from the groups. According to an embodiment of the present disclosure, when security is set for the user identification information and a designated security key is input, the SIM module may complete the selecting. According to an embodiment of the present disclosure, the SIM module may perform communication functions corresponding to the user identification information independently based on the communication environments corresponding to the two or more pieces of user identification information. According to an embodiment of the present disclosure, the SIM module may automatically select based on the metadata of the SIM module. According to an embodiment of the present disclosure, the SIM module may request the first processor to display the user identification information which is communicating in the communication environments on the electronic device. According to an embodiment of the present disclosure, the SIM module may include, in a second memory, metadata storing one or more of information indicating whether the user identification information is activated or deactivated, information on a group when the user identification information is included in a designated group, information on one or more groups, the user identification information included in the group, and information on a location where the user identification information is stored. According to an embodiment of the present disclosure, the first processor may communicate via at least one communication environment corresponding to a location of the electronic device from among the loaded two or more communication environments.

According to various embodiments of the present disclosure, multiple pieces of SIM information can be stored in a single SIM card, and the electronic device can connect communications via telecommunications business operators corresponding to two or more pieces of SIM information in the single electronic device through multiple pieces of SIM information included in the single SIM card.

At least part of an apparatus and method based on the embodiments disclosed in the claims and/or specification of the present disclosure can be implemented in the form of hardware, software, firmware, or a combination of two or more of the hardware, software, and firmware (e.g., in the form of a module or unit). The module refers to a minimum unit of an integrally configured component or a part of it and may be a minimum unit for performing various embodiments of the present disclosure or a part of it. The module may be mechanically or electronically implemented. When implemented in software, a computer readable storage medium for storing one or more programs (or a programming module) can be provided. For example, the software may be implemented by using instructions stored in a computer readable storage medium in the form of a programming module. One or more programs include instructions for allowing the electronic device to execute the methods based on the embodiments disclosed in the claims and/or specification of the present disclosure. When the instructions are executed by one or more processors (e.g., the processor 120), the one or more processors may perform a function corresponding to the instructions. The computer readable storage medium may be the memory 130, for example. At least part of the programming module may be implemented (e.g., executed) by using the processor 120. At least part of the programming module may include a module, a program, a routine, sets of instructions, a process, and the like for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or programming module according to various embodiments of the present disclosure may include one or more of the above-described elements, may omit some elements, or may further include additional elements. The operations performed by the module, the programming module, or the other elements according to various embodiments of the present disclosure may be performed serially, in parallel, repeatedly, or heuristically. In addition, some operation may be performed in different order or may omitted, and an additional operation may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
   determining that a subscriber identity module (SIM) stores first SIM information associated with a first mobile network operator (MNO) and a second SIM information associated with a second MNO different from the first MNO;
   displaying, in response to the determining, first information for indicating the first MNO and second information for indicating the second MNO based on metadata stored in the SIM; and
   in response to detecting an input on the displayed first information, communicating with another electronic device based on the first SIM information,
   wherein the metadata includes information on a first group and information on a second group distinct from the first group,
   wherein each of the first group and the second group includes at least one of the first SIM information or the second SIM information, and
   wherein total SIM information included in the first group is distinct from total SIM information included in the second group.

2. The method of claim 1, wherein the metadata further comprises information on priority for the first SIM information and the second SIM information.

3. The method of claim 2, further comprising:
   displaying one of the first SIM information and the second SIM information based on the information of priority.

4. The method of claim 1, further comprising:
   determining a location of the electronic device;
   identifying, among the first SIM information and the second SIM information, the second SIM information corresponding to the determined location; and
   displaying the identified second SIM information to communicate with another electronic device.

5. The method of claim 1,
wherein the metadata further includes information for indicating whether the first SIM information and the second SIM information are activated,
wherein the first information indicates that the first SIM information is activated, and
wherein the second information indicates that the second SIM information is activated.

6. The method of claim 1, wherein the metadata further includes attribute information for the first SIM information and the second SIM information.

7. The method of claim 1, further comprising:
in response to detecting another input on the first information and the second information, communicating with a first electronic device based on the first SIM information and communicating with a second electronic device based on the second SIM information.

8. The method of claim 7, wherein the communicating with the first electronic device is separate from the communicating with the second electronic device.

9. An electronic device comprising:
a memory configured to store instructions;
a display unit; and
a processor, electrically coupled to the memory and the display unit, configured to execute the stored instructions to:
determine that a subscriber identity module (SIM) stores first SIM information associated with a first mobile network operator (MNO) and second SIM information associated with a second MNO different from the first MNO;
display, in response to the determining, first information for indicating the first MNO and second information for indicating the second MNO based on metadata stored in the SIM, and
in response to detecting an input on the displayed first information, communicate with another electronic device based on the first SIM information,
wherein the metadata includes information on a first group and information on a second group distinct from the first group,
wherein each of the first group and the second group includes at least one of the first SIM information or the second SIM information, and
wherein total SIM information included in the first group is distinct from total SIM information included in the second group.

10. The electronic device of claim 9, wherein the metadata further comprises information on priority for the first SIM information and the second SIM information.

11. The electronic device of claim 10, wherein the processor is further configured to execute the stored instructions to:
display one of the first SIM information and the second SIM information based on the information of priority.

12. The electronic device of claim 9, wherein the processor is further configured to execute the stored instructions to:
determine a location of the electronic device,
identify, among the first SIM information and the second SIM information, the second SIM information corresponding to the determined location, and
display the identified second SIM information to communicate with another electronic device.

13. The electronic device of claim 9,
wherein the metadata further includes information for indicating whether the first SIM information and the second SIM information are activated,
wherein the first information indicates that the first SIM information is activated, and
wherein the second information indicates that the second SIM information is activated.

14. The electronic device of claim 9, wherein the metadata further includes attribute information for the first SIM information and the second SIM information.

15. The electronic device of claim 9, wherein the processor is further configured to execute the stored instructions to:
in response to detecting another input on the first information and the second information, communicate with a first electronic device based on the first SIM information and communicate with a second electronic device based on the second SIM information.

16. The electronic device of claim 15, wherein the communicating with the first electronic device is separate from the communicating with the second electronic device.

17. A non-transitory computer-readable storage medium for storing one or more programs for executing an operation of:
determining that a subscriber identity module (SIM) stores first SIM information associated with a first mobile network operator (MNO) and second SIM information associated with a second MNO different from the first MNO;
displaying, in response to the determining, first information for indicating the first MNO and second information for indicating the second MNO based on metadata stored in the SIM; and
in response to detecting an input on the displayed first information, communicating with another electronic device based on the first SIM information,
wherein the metadata includes information on a first group and information on a second group distinct from the first group,
wherein each of the first group and the second group includes at least one of the first SIM information or the second SIM information, and
wherein total SIM information included in the first group is distinct from total SIM information included in the second group.

* * * * *